United States Patent Office 2,968,499
Patented Jan. 17, 1961

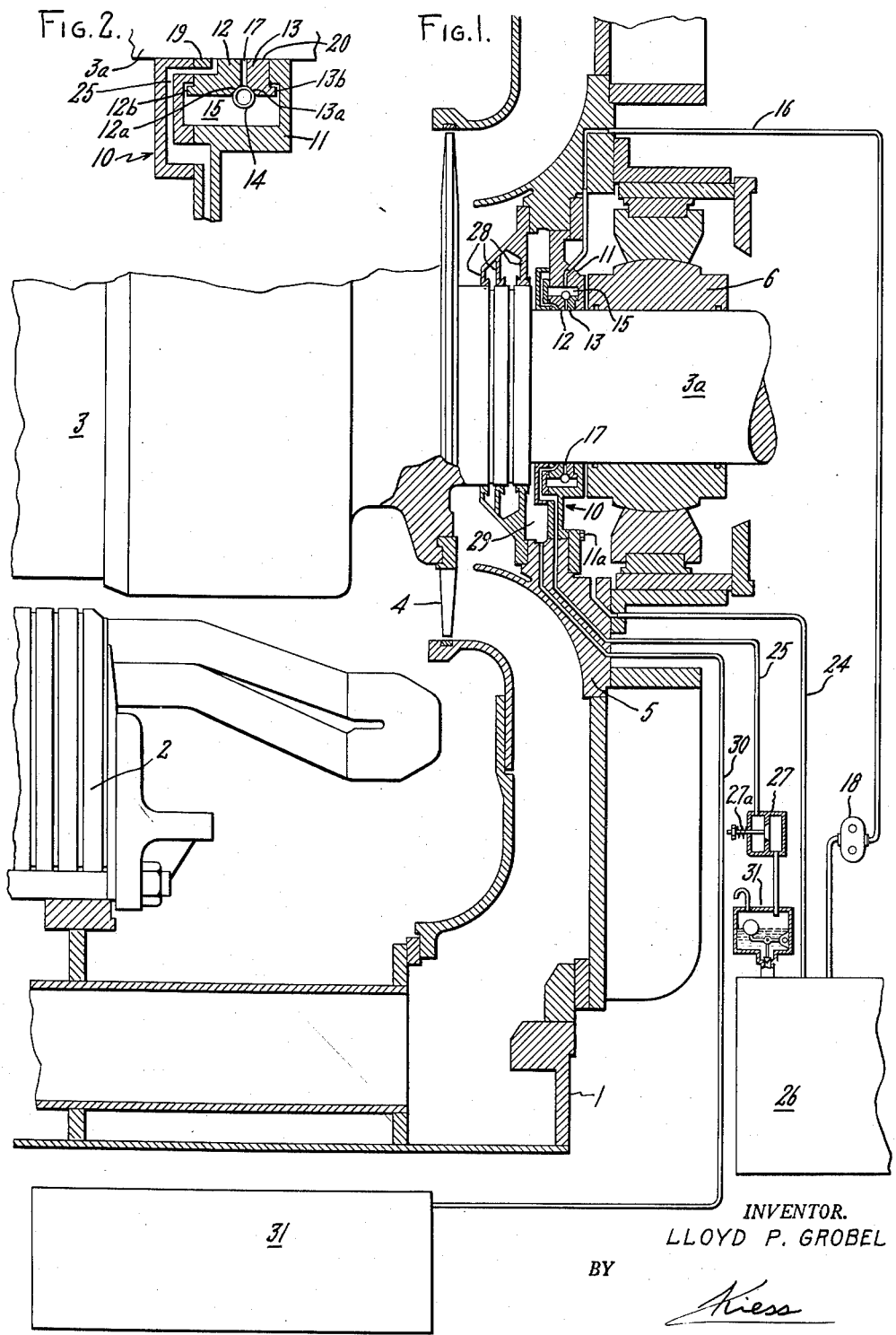

2,968,499

SHAFT SEAL FOR HYDROGEN-COOLED GENERATOR

Lloyd P. Grobel, Schenectady, N.Y., assignor to General Electric Company, a corporation of New York Filed July 16, 1957, Ser. No. 672,298

4 Claims. (Cl. 286—9)

My invention relates to a liquid film seal for preventing the scape of gas along a shaft from a gas filled motor or generator casing.

In a gas cooled generator, for example, the casing is provided with a gas for ventilating the windings and other internal parts. This gas, such as hydrogen, is at a pressure above atmosphere and the casing must be sealed to prevent leakage of the hydrogen and the contamination of the ventilating gas by outside air. Furthermore, it is desirable to maintain the purity of the gas substantially constant and at a high level since failure to do so adversely affects the cooling properties of the gas and concurrently enhances the windage loss which it causes in the machine. It is noted that the purity of hydrogen must be maintained above the explosive limit which is 75% hydrogen and 25% air.

The major hydrogen leakage flow path could occur between the shaft and surrounding housing at the ends of the machine. In order to prevent this leakage, a liquid film shaft seal of the general type disclosed in my U.S. Patent 2,647,771, which is assigned to the assignee of the present invention, has been used. This shaft sealing arrangement essentially consists of a resiliently mounted ring which surrounds the shaft and defines therewith an annular clearance into which liquid under pressure is provided to prevent the leakage of gas from the generator casing. The oil, or other liquid used, is forced into the clearance between the shaft and ring at a pressure slightly higher than the hydrogen pressure. This design presents the problem of preventing the contamination of the ventilating gas by sealing fluid and the contamination of sealing fluid by ventilating gas. If excessive contamination is likely to occur, elaborate and costly purging and purifying apparatus may be required. In addition, the problem of preventing the ingress of sealing fluid is made more acute with the use of larger generator shafts since the leakage path is directly proportional to the shaft diameter.

Accordingly, an object of this invention is to provide an improved shaft seal of the liquid film type which minimizes the flow of sealing fluid to the enclosed gas side of the seal.

Another object is to provide a shaft seal which permits the use of oil, as received from the oil vendor, in the larger generators now being built.

Other objects and advantages will become apparent from the following description taken in connection with the accompanying drawings, in which Fig. 1 is a partial sectional side view of a dynamoelectric machine, such as a large generator, embodying my improved shaft seal; and Fig. 2 is an enlarged sectional view of the lower half of the novel shaft seal assembly.

Generally stated, the invention is practiced by providing a liquid film shaft seal assembly for preventing the leakage of hydrogen from a hydrogen cooled generator which includes a bleed conduit for draining off the sealing liquid before it enters the casing to substantially reduce the flow of liquid into the casing to prevent contamination of the hydrogen by the air contained in the untreated liquid.

Referring now to Fig. 1, there is illustrated a sectional view of a lower end portion of a dynamoelectric machine comprising a casing 1 filled with a ventilating gas such as hydrogen and containing stationary member 2, and rotor 3. The hydrogen is circulated within the casing 1 by a fan 4 to cool the windings and various other parts of the machine. Rotor 3 includes a shaft 3a which extends through an end wall 5 of the casing 1 and is supported by bearings, one of which is shown at 6. The bearing 6 is in turn carried indirectly by the end wall 5, and lubricating oil is supplied to the bearing 6 through a suitable bearing lubricating oil feed supply system (not shown). An analogous bearing is provided at the other end of the machine.

The pressure of the hydrogen may vary from one-half p.s.i.g. to sixty p.s.i.g. or more depending on the operating condition of the machine desired. Under all such conditions, it is obviously desirable that a seal be provided about the shaft to prevent either the escape of gas from the casing or the introduction of ambient air into the casing. To accomplish this sealing function, a shaft seal arrangement 10 fixed to the casing end wall 5, and extending radially inward to the shaft 3a is provided at each end of the machine. The shaft seal arrangement consists of a housing member 11 which may, as shown, be attached to the end wall 5, or to any stationary part such as the adjacent bearing housing, by bolts 11a. As illustrated in the drawing, housing member 11 is of such a shape that an annular chamber 15 opening onto the shaft 3a is provided therein. Located in chamber 15 are two diametrically split annular rings 12, 13 which are held in sealing engagement with the shaft member 3a by spring bands or "garter springs" 14 (see Fig. 2). The springs are attached to housing 11 by pin means (not shown) to prevent them from rotating. Rings 12, 13 are spaced from housing walls 11 by clearances 12b, 13b respectively, to permit radial movement thereof and effect a seal between the rings and adjacent wall as described hereinafter. Thus, rings 12, 13 are arranged about the shaft 3a such that if the shaft moves radially, the rings are free to move with the shaft.

A lubricating, sealing, and cooling fluid such as oil that has not had the air removed, is supplied under pressure to annular chamber 15 through conduit 16 by pump 18. The fluid in chamber 15 cools rings 12, 13 to minimize expansion of the rings due to increased temperatures. The sealing oil flows between the coils of spring 14 and gap 17 formed between rings 12, 13 to the minute leakage paths 19, 20 formed between rings 12, 13 and shaft 3a respectively. It is to be noted that the sealing fluid in chamber 15 is prevented from leaking between rings 12, 13 and the adjacent walls of chamber 15 by spring 14 which engages chamfered surfaces 12a, 13a to bias rings 12, 13 axially into contact with the adjacent chamber walls.

Clearance space 19 is made about one-fifth that of clearance 20 so that the major fraction of the oil flowing into chamber 15 flows out toward bearing 6 and only a small amount flows through clearance 19 inward to the enclosed hydrogen-filled casing 1. The minimum practicable size of clearance 19 is determined by the machining tolerance possible to obtain, combined with the minimum space necessary to properly lubricate the ring 12 and shaft 3a. The leakage of hydrogen through leakage path 19 is prevented by maintaining the sealing oil pressure slightly higher than the hydrogen pressure. For example, if the hydrogen pressure is 30 p.s.i., the oil pressure should be about 35 p.s.i. This pressure differential is necessary to insure that the hydrogen will not force the oil out of the clearance gap and escape. Tests have shown that with a substantially smaller differential, the gas pressure may temporarily exceed the oil pressure and escape through the bearing housing to atmosphere.

However, without the use of my invention, and with a shaft diameter on the order of sixteen inches or more, the oil which flows into casing 1 through clearance 19 may be sufficient to contaminate the hydrogen in the casing and necessitate vacuum treating of the oil or extensive purging. To reduce the flow of oil to the interior of casing 1 and thus eliminate the necessity of the elaborate equipment necessary for such treatment, I provide a novel shaft sealing assembly which removes most, or a large part, of the oil flowing through clearance 19 before it enters casing 1. This is desired when untreated oil is used since it carries tiny bubbles of air inside the machine which could eventually dilute the hydrogen gas to a point approaching an explosive mixture. This is accomplished by forming a bleed-off passage 25 from clearance 19 through an intermediate portion of ring 12 to a reservoir 26. The fluid in passage 25 is maintained at a pressure slightly higher than the hydrogen pressure by a pressure controller such as a suitable pressure-regulating valve, shown diagrammatically at 27. Spring 27a of valve 27 may be adjusted so that a pressure in conduit 25 slightly greater than the casing pressure will open the valve 27 and drain the oil flowing into conduit 25 through clearance 19 to tank 26. If such a back pressure is not maintained in conduit 25 the hydrogen in casing 1 may escape therethrough in large quantities. Spring 27a can be adjusted to maintain the required pressure in conduit 25 in accordance with the gas pressure being maintained in casing 1. Thus, the fluid in clearance 19 between conduit 25 and casing 1 is above the gas pressure in casing 1 which prevents the escape of large quantities of hydrogen. Located between valve 27 and reservoir 26 is float trap 31 which vents to atmosphere any hydrogen and/or air entrained in the oil in conduit 25. With valve 27 set to hold a pressure of 32 p.s.i. in space 25 and casing 1 containing hydrogen at 30 p.s.i., and the inlet oil pressure in chamber 15 at 35 p.s.i., the majority of oil flowing through clearance 19 flows out through bleed passage 25. Thus the oil flow into casing 1 is substantially reduced while preventing the escape of hydrogen from casing 1.

Located inboard of the seal housing 11 are oil deflector rings 28 which deflect the oil that leaks into casing 1 through clearance 19 down into annular chamber 29. Conduit 30 drains annular chamber 29 to the gas "detraining tank" 31 where the hydrogen is separated from the oil. The details of this arrangement are not important to the present invention and any further description desired can be obtained from my U.S. Patent 2,454,979, issued November 30, 1948, and assigned to the assignee of the present invention. The oil that leaks through clearance 20 mixes with the bearing oil and is returned to reservoir 26 through conduit 24.

The small amount of entrained air which leaks into chamber 29 can be drawn off in a manner disclosed in my aforementioned Patent 2,454,979 and thus prevent the dilution of hydrogen to a point approaching an explosive mixture. However, with my improved seal design there is so little oil flow to the hydrogen side of the machine that only minimum bleeding of the gas in chamber 29 has been found necessary.

In operation, sealing oil fed to housing 11 and chamber 15 by pump 18 through conduit 16 flows through gap 17 between rings 12, 13 to the sealing clearances 19, 20 between the rings 12, 13 and the rotating shaft 3a. The oil flowing through housing 11 initially functions to cool rings 12, 13 to limit their thermal expansion. Most of the oil flowing into the clearances 19, 20 between the rings 12, 13 and shaft 3a flows through clearance 20 toward bearing 6 from where it is drained off through conduit 24 to reservoir 26. The majority of the oil that flows through clearance 19 toward chamber 29 in casing 1 is bled off through passage 25 to reservoir 26. The hydrogen and air entrained in passage 25 is allowed to escape from float trap 31. The small amount of oil that flows into chamber 29 is drained off through conduit 30 to detraining tank 31 where the hydrogen is separated from the oil.

A shaft seal arrangement embodying my invention was mounted and tested on a 16-inch diameter shaft running at 3600 r.p.m. in an atmosphere of 30 p.s.i. gas pressure. The clearances 19, 20 were designed with a radial clearance of 1½ mils and 7½ mils respectively, before being heated. With an oil inlet flow into chamber 15 (on each side of the machine) of approximately 10 gallons per minute, the indicated oil flow toward the hydrogen side of the ring was approximately 1½ gallons per minute but the flow into the casing was less than ½ gallon per minute. This is approximately one-third the flow that would occur if my invention was not employed. (The oil flow was measured under normal running conditions at which time clearances 19, 20 were approximately double their original size due to thermal expansion of the ring.)

While I have illustrated and described a particular embodiment of my invention, modifications thereof will occur to those skilled in the art. For example, the back pressure in conduit 25 can be maintained by a differential pressure control mechanism set for a predetermined pressure between the oil pressure in inlet conduit 16 and the gas pressure in casing 1. Also, the shaft seal mechanism is not limited to two seal rings but is adaptable for use with a 1, 2, or 3 ring assembly. I desire it to be understood, therefore, that my invention is not to be limited to the particular arrangement disclosed, and I intend to cover in the appended claims all modifications which do not depart from the spirit and scope of my invention.

What I claim as new and desire to secure by Letters Patent of the United States is:

1. In a machine having an enclosed gas-filled casing and a rotatable shaft extending through said casing, a shaft seal assembly for preventing gas leakage from said casing including a housing defining an annular chamber opening onto said shaft, sealing ring means located in said annular chamber about said shaft and defining a clearance therewith, means including first conduit means defined by said ring means for supplying sealing liquid under a pressure higher than the casing pressure to said clearance to prevent the leakage of gas from said casing, means including a second conduit means defined by said ring means opening into said clearance and located between said first conduit means and the interior of the casing and at a pressure intermediate of the gas pressure and the sealing liquid supply pressure for draining off liquid flowing toward said casing through said clearance, and means for maintaining the liquid in said second conduit means in contact with the shaft at a pressure intermediate a desired chamber pressure and a desired gas casing pressure, whereby the flow of liquid into the casing is substantially reduced.

2. A dynamoelectric machine having a gas filled casing and a rotatable member having a shaft extending through said casing, a shaft seal assembly secured to said casing and including a housing defining an annular chamber opening onto said shaft, two sealing rings located in said annular chamber defining an annular clearance space with said shaft, means including a first passage between said rings for supplying liquid under a pressure higher than the casing gas pressure to said housing and annular clearance space to form a liquid seal to prevent the leakage of gas from the casing, spring means located in said housing biasing the rings into contact with the inner housing walls to prevent the leakage of fluid therebetween, and means including a second liquid passage defined by the ring adjacent the interior of the casing and opening into said clearance space for bleeding off a portion of the liquid in said clearance space flowing toward the casing to minimize the flow of liquid into the casing, the last-mentioned means including control means for maintaining the liquid in said second conduit means in contact with the shaft at a positive pressure intermediate a desired liquid pressure in said chamber and a desired gas pressure in said casing.

3. In a machine having a gas tight casing and a rotatable shaft extending through the casing, a sealing assembly for preventing the leakage of gas between the shaft and casing including a housing having a chamber containing a plurality of sealing rings defining a clearance space with said shaft, spring means urging the rings into sealing engagement with said shaft, means for supplying sealing liquid under a first pressure higher than the pressure in the casing to said clearance space, conduit means communicating with the clearance space intermediate the casing and the supply means for draining the liquid in said clearance space, and means for maintaining the pressure of the liquid in said conduit means in contact with the shaft slightly above a desired casing pressure but less than the first pressure whereby the gas in the casing is prevented from escaping, said last-mentioned means including a pressure regulating valve means.

4. A dynamoelectric machine having a casing filled with gas under pressure and containing a rotatable member having a shaft extending through said casing, a shaft seal assembly secured to the casing located between the casing and a bearing assembly for supporting the shaft, the seal assembly including a housing defining an annular chamber opening onto said shaft, two segmented sealing rings located in said annular chamber defining an annular clearance space with the shaft, means including a first passage defined between said rings for supplying liquid under a pressure higher than the gas pressure in the casing to said chamber and annular clearance space to form a liquid seal for preventing the escape of gas from said casing, the clearance space defined between the ring and shaft adjacent the casing being substantially smaller than the clearance space between the ring and shaft adjacent the bearing assembly whereby the main liquid flow occurs toward the bearing, annular spring means in said chamber for resiliently biasing the rings into contact with the shaft to permit radial movement of the rings and with the inner housing walls to prevent leakage of fluid between the housing and rings, conduit means including a second passage in communication with the clearance space defined by the ring adjacent the interior of the casing for drawing off a major portion of the sealing liquid flowing from said first passage toward the interior of the casing, and a regulating valve means in said conduit means for maintaining the pressure of the liquid adjacent the shaft intermediate the desired pressures in said casing and first passage.

References Cited in the file of this patent

UNITED STATES PATENTS

| | | |
|---|---|---|
| 980,282 | Junggren | Jan. 3, 1911 |
| 1,317,294 | Hildebrand | Sept. 30, 1919 |
| 2,175,868 | Bentley | Oct. 10, 1939 |
| 2,236,274 | Rice et al. | Mar. 25, 1941 |
| 2,246,912 | Baudry | June 24, 1941 |
| 2,350,753 | Grobel | June 6, 1944 |
| 2,470,664 | Sterrett | May 17, 1949 |
| 2,501,304 | Baudry et al. | Mar. 21, 1950 |
| 2,636,754 | Baudry | Apr. 28, 1953 |
| 2,650,116 | Cuny | Aug. 25, 1953 |